United States Patent [19]

Harris et al.

[11] Patent Number: 4,842,844
[45] Date of Patent: Jun. 27, 1989

[54] METHOD OF GENERATING HYDROGEN

[75] Inventors: William G. Harris, Seattle; Douglas J. Silva, Kent, both of Wash.

[73] Assignee: The Boeing Company, Seattle, Wash.

[21] Appl. No.: 50,447

[22] Filed: May 18, 1987

Related U.S. Application Data

[62] Division of Ser. No. 761,995, Aug. 2, 1985, Pat. No. 4,753,779.

[51] Int. Cl.[4] ............................................... C01B 1/07
[52] U.S. Cl. ..................................... 423/657; 137/15; 137/247.27; 423/658; 423/659; 429/17; 429/19
[58] Field of Search ................. 423/648 R, 659, 657, 423/658

[56] References Cited

U.S. PATENT DOCUMENTS

| Re. 23,942 | 8/1955 | Shabaker . | |
|---|---|---|---|
| 98,442 | 12/1869 | Steiner | 423/658 |
| 2,802,724 | 8/1957 | Johnson | 422/265 |
| 3,235,344 | 2/1966 | Dreyer et al. | 422/191 |
| 3,585,007 | 6/1971 | Gross | 423/648 R |
| 3,838,524 | 10/1974 | Hencke et al. | 423/659 |
| 3,853,986 | 12/1974 | Blass et al. | 423/659 |
| 3,918,930 | 11/1975 | Forbes et al. | 423/659 |
| 4,026,674 | 5/1977 | McDonald | 423/659 |
| 4,064,226 | 12/1977 | Becker et al. | 423/648 R |
| 4,098,873 | 7/1978 | Hollingsworth | 423/659 |
| 4,205,044 | 5/1980 | Gramatica | 422/191 |
| 4,482,523 | 11/1984 | Peterson | 422/148 |
| 4,650,660 | 3/1987 | Harris | 423/648 R |

FOREIGN PATENT DOCUMENTS

| 131801 | 7/1985 | Japan | 423/658 |
| 1748 | of 1861 | United Kingdom | 423/648 R |
| 9773 | of 1885 | United Kingdom | 423/648 R |

Primary Examiner—John Doll
Assistant Examiner—Wayne A. Langel
Attorney, Agent, or Firm—John C. Hammar

[57] ABSTRACT

Hydrogen gas is generated on demand by reacting hydrochloric acid (haloacid) and a pure metal by flowing the acid upwardly through a bed of metal particles held on a distributor plate within a sliding tray. The tray reciprocates in a receiving vessel. A port in the retaining vessel can be aligned with a drain port in the sliding tray (below the distributor plate) so that the solution in the bed can be shunted directly to an annulus between the retaining vessel and the reactor jacket, thereby eliminating contact of acid and metal and stopping the generation of hydrogen. A coolant may be circulated in the base of the retaining vessel to control the temperature of the acid as it enters the bed, thereby helping to control the reaction rate. A hydrogen generator reactor includes one or more sliding trays housed within a jacket.

20 Claims, 6 Drawing Sheets

METHOD OF GENERATING HYDROGEN

The United States Government has rights in this invention pursuant to Contract No. F04704-82-C-0038.

REFERENCE TO RELATED APPLICATIONS

This application is a divisional application based upon U.S. Ser. No. 761,995, filed Aug. 2, 1985. now U.S. Pat. No. 4,753,779

TECHNICAL FIELD

The present invention relates to an improved apparatus and method for generating essentially pure hydrogen gas on demand by the reaction of an acid with pure metal particles in a controlled environment. Features of the reactor allow efficient and controllable operation to produce the gas with a minimum waste.

BACKGROUND ART

While it has long been known that hydrogen gas can be generated by the reaction of acids with pure metals, efficient reactors for the controlled production of essentially pure hydrogen gas on an "as needed" basis have not been pursued. For the deep basing environment of the Intercontinental Ballistic Missile program, however, there is incentive to optimize the method and apparatus for generating hydrogen. In the deep basing environment, a network of tunnels, drifts, and raises will be located far enough underground that the base could survive a very large scale nuclear attack. A power source that can operate without access to outside resources, particularly without the need for combustion air, large scale cooling, or significant waste or by-product disposal, is essential to the survival and post-attack usefulness of such a base. The optimized method and apparatus of the present invention for generating essentially pure hydrogen gas on a demand basis uses dilute hydrochloric acid or another suitable halide acid to provide a non-toxic waste product, including soluble metal chlorides (or halides), and hydrogen gas that is suitable for use in a hydrogen-halide fuel cell. Storage of hazardous hydrogen gas is minimized. The acid is a by-product of the fuel cell operation.

SUMMARY OF THE INVENTION

Essentially pure hydrogen gas can be generated in an efficient manner on demand by the reaction of hydrochloric acid with a metal. The hydrochloric acid solution is introduced to the bottom of a bed of essentially pure metal particles and is forced upwardly through the bed to promote the reaction. The flow of acid through the bed should be sufficiently low to avoid fluidizing the particles in the bed so that all the particles remain in the bed and dissolve completely. The flow is counter-gravity so that all the metal dissolves without blocking or clogging a distributor plate, which supports the bed. In this way a substantially pure hydrogen gas stream is generated using a minimum amount of pure metal. The output of hydrogen gas is maximized per unit volume of metal. The design allows metal to be added to each bed without interfering with the operation of the generator.

The generator usually has multiple stages, with the first stage having a bed of iron and a later stage, a bed of zinc. Zinc has a higher reaction rate with hydrochloric acid (by about 500 times) than the iron particles. Thus, as the acid is diluted by the reaction, the susceptance of the metal particles to the acid is increased to promote the reaction. Nearly all the HCl can be consumed.

The rate of reaction is controllable by cooling the incoming hydrochloric acid with a refrigerant, such as cooling water, that flows below the distributor plate.

Each processing stage of the generator preferably includes a retaining vessel and an internal sliding tray received within the retaining vessel. The refrigerant is introduced under the retaining vessel and creates a variable volume chamber between the bottom of the vessel and the bottom of the tray. By restricting the flow of refrigerant from the chamber, the tray can be raised or lowered above the bottom of the vessel. A pair of ports (one on the vessel and one on the tray) can be aligned to allow fluid within the tray to flow from the tray and the vessel, draining the bed quickly and stopping the generation of hydrogen.

The metal particles are deposited on a distributor plate mounted in the sliding tray above the bottom to define a cavity, and hydrochloric acid is forced upwardly from the cavity through the distributor plate and into the bed. The tray port generally communicates with the cavity and is on the tray wall below the distributor plate. HCl solution need not enter the bed when stopping the reaction is desired. In this way, manufacture of unwanted hydrogen gas is avoided. The need to flood the bed with a nonreactive, quenching solution to slow or stop the reaction is also eliminated. Hydrogen can be controllably generated on demand, and only a minimum of hydrogen need be stored.

Surges of acid solution between stages are controlled with a surge control means that includes no moving parts. A pipe is filled with a plurality of tubes or standpipes of different diameter. The tubes project out of the pipe into the internal volume of a funnel collector on the upper end of the pipe, and require the solution to pool in the funnel before entering the pipe. The tubes are positioned at different heights to regulate the flow within desired limits.

These and other novel features of the present invention will be apparent by reference to the accompanying drawings and detailed description.

BEST MODE CONTEMPLATED FOR CARRYING OUT THE INVENTION

1. The Nature of the Problem

Figure 1:
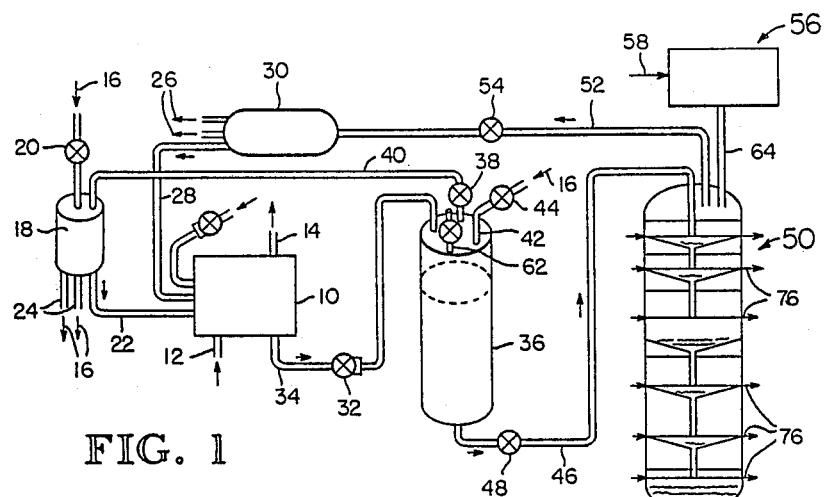
FIG. 1 is a schematic of a preferred closed cycle electrical power generation system especially adapted for a deep basing enviornment and using the hydrogen generator of the present invention.

Protecting strategic systems and personnel from nuclear weapon effects is becoming more difficult as weapon kill effectiveness improves. One attractive concept for such protection, known as deep basing, would locate the facilities several thousand feet underground. These deep basing environments, however, create unique problems associated with the close-cycle living environment that is necessary for survival. Essential to the survival and post-attack usefulness of such a base is a power source that can operate in this environment without access to outside resources, such as combustion air, sources of cooling, or large capacity waste disposal facilities, especially of hazardous wastes. The power system, particularly for electrical energy, must be readily packaged, be shock isolated, and, most important, be efficient. Storage of hazaraous materials (reactants, intermediates, or wastes) should be avoided. The system should be capable of laying dormant for extended time periods without degradation.

As described in a paper by William Harris entitled "Chlorine as an Oxidezer for a Closed Cycle Power Plant." delivered Feb. 13, 1985, a hydrogen-halide fuel cell is the best candidate for genereating electricity for deep basing. Safe storage and handling of the reactants, hydrogen and halogen, however, is a primary concern to the implementation of a hydrogen-halide fuel cell. One feature of the present invention relates to a hydrogen generator that is capable of creating hydrogen on demand from by-products of the fuel cell, and that virtually eliminates the hazard of storing hydrogen gas.

Safety considerations dictate that large quantities of hydrogen gas cannot be stored in the deep basing environment. Hydrogen can be safely generated by the reaction of dilute hydrochloric acid (a by-product of the fuel cell operation) on a pure metal. Although a large selection of cations can be used as fuel for the hydrogen generator, selection of the fuel is dictated by several considerations. For example, the fuel should be plentiful, should be readily avilable in a form that is easily used, and should be inexpensive. The heat released diring the exothermic reaction between the acid and the metal should be as low as possible to minimize heat sink requirements. Finally, the waste products created in the reaction should remain soluble in water to allow easy removal and storage. Based upon these conditions, iron is the preferred metal, because it is readily available in pellet form, has a low heat of reaction with hydrochloric acid, and is inexpensive. Zinc is preferred for secondary reaction beds (where the acid is diluted), since zinc has a reaction rate with hydrochloric acid of about 500 times greater than that of iron. Both zinc and iron chlorides are compatible for the waste product solution, even when mixed. Although iron and zinc are preferred, other metals may be used, such as lead or copper.

Hydrogen as a primary fuel is becoming increasingly attractive as fossil fuel supplies dwindle. Hydrogen has a very high thermal heating value of about 60,000 BTU's per pound compared to about 20,000 BTU's per pound for fossil fuels. Although hydrogen is one of the most plentiful elements, use of hydrogen as a fuel has progressed slowly because of storage and handling probblems resulting from the extreme flammability of hydrogen over a wide range of air mixtures at ambient temperatures.

Power sources for underground installation would be extremely vulnerable if large amounts of hydrogen were stored. Catholytic oxidation of hydrogen in fuel cells using oxygen or halogen gases (chlorine or bromine) appears, however, to be an efficient and preferred method for obtaining electrical energy in closed cycle underground systems. The most efficient fuel cell power system for the underground installations is probably a hydrogen-chlorine fuel cell, under development by Hamilton Standard Electro-chem, Inc., a division of United Technologies Corp., which produces electricity and by-product HCl.

The present invention uses the by-product hydrochloric acid to recycle the hydrogen safely and easily, thereby alleviating any storage problem for hydrogen in the deep basing environment. The unit can be compactly designed to minimize the length of hydrogen lines and allow isolation of the entire system on a shock isolation platform, if desired.

2. The Power System

As shown in FIG. 1, the deep basing closed cycle power system includes a hydrogen-chlorine fuel cell 10 having a cooling water inlet 12 and outlet 14 for controlling the reaction of chlorine and hydrogen within the fuel cell 10. Chlorine 16 enters a distributor 18 through a check value 20 from liquid storage and enters the fuel cell 10 through a feed line 22. Other lines 24 on the distributor 18 direct chlorine 16 to other cells (not shown) in the power system.

Hydrogen 26 enters the fuel cell 10 through a feed line 28 from an accumulator 30, which also distributes the hydrogen 26 to the other cells. Electricity and heat are generated in the fuel cell 10. A waste product comprising hydrochloric acid in water and unreacted chlorine enters a pump 32 through line 34, and is pumped into a receiver 36 for the separation of chlorine gas from the acid solution. The gaseous chlorine is recycled through the check value 38 and return line 40 to the chlorine distributor 18. Chlorine 16 may, alternatively, be added to the receiver 36 through line 42 and check valve 44 to increase the concentration of the acid solution.

The dilute hydrochloric acid solution leaves the receiver through line 46 and flow regulator 48, and enters the first stage of the hydrogen generator 50, the details of which will be described. Essentially pure hydrogen gas, created in the hydrogen generator 50, is diverted through line 52 to the hydrogen accumulator 30 through a flow regulator 54. A solid fuel feed system 56 allows the addition of metal particles 58 to the several beds 66 of the hydrogen generator 50 without contaminating the controlled environment of the generator.

A waste stream 60 is withdrown from the bottom of the hydrogen generator 50, and includes a solution of metal chlorides in water with a trace of hydrochloric acid. This waste stream 60 is stored in suitable storage facilities, such as within a raise of the base that was originally used to store water.

During transit conditions, if excess hydrochloric acid is generated in the fuel cell 10 during consumption of hydrogen, this excess acid solution raises the pressure within the receiver 36 and opens check valve 38 to allow chlorine to flow into the fuel cell distributor 18 through line 40, thereby maintaining the pressure within the receiver 36. The small amount of HCl which is removed in the waste stream 60 is replenished to the system through line 62 in the receiver 36.

Figure 10:
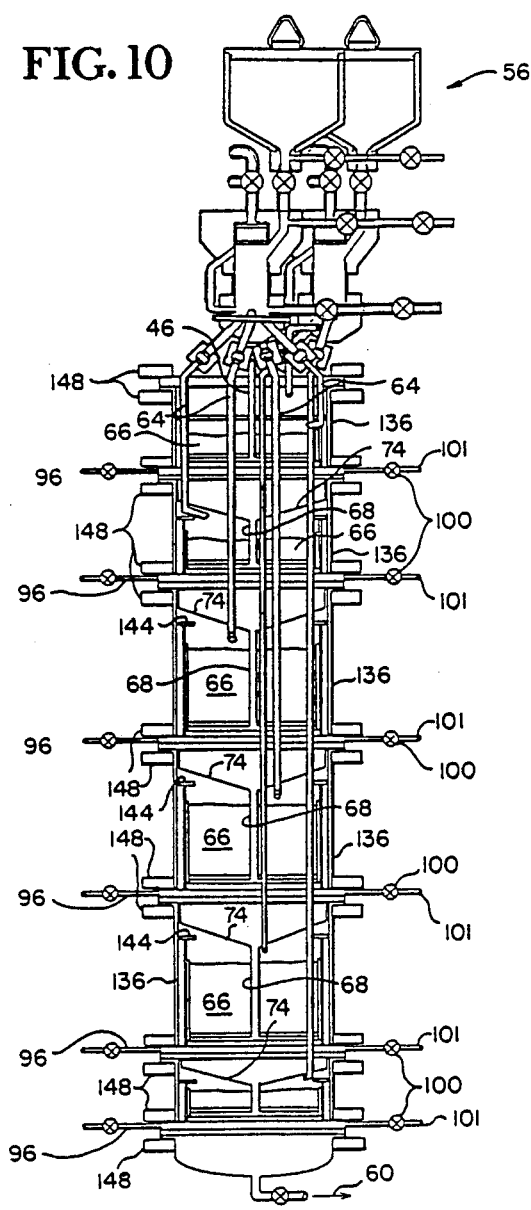
FIG. 10 is another detailed sectional schematic of the hydrogen generator, similar to FIG. 7.

As shown in FIG. 10, the solid fuel feed system 56 includes one or more fuel distribution lines 64 which direct the solid fuel to the reaction beds 66 within the generator 50. For clarity, the distribution lines 64 have been truncated in FIGS. 1,2, and 7, and have been deleted entirely in FIGS. 3,4, and 5.

3. The Generator

Figure 2:
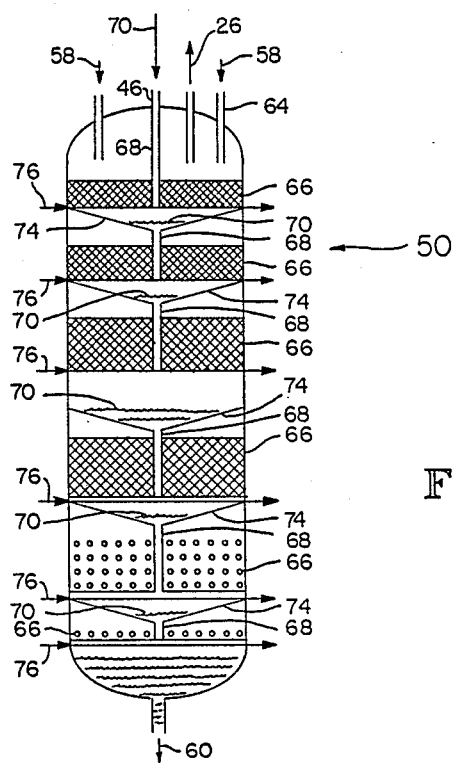
FIG. 2 is a detailed schematic of the hydrogen generator shown in FIG. 1.

A preferred hydrogen generator 50 is illustrated schematically in FIG. 2 where the reaction of hydrochloric acid with metal particles is carried out in six process stages by flowing the hydrochloric acid progessively through six beds 66. The top four beds in vertical stack of the hydrogen generator 50 are illustrated with patched lines designating that these beds contain iron particles, while the beds of the lower two processing stages are designated by circles to indicate that these beds contain zinc. The depth of particles in each bed is controllable to control the residence time of acid within each bed, thereby controlling the heat and hydrogen gas that are created.

Each processing stage of the hydrogen generator 50 includes a centrally located downcomer 68 which delivers the hydrochloric acid solution 70 to the bottom of each bed where the solution 70 flows upwardly through the bed 66 to create hydrogen during contact with the metal. Emerging from the top of the bed, the solution passes into an annulus 72 (FIG. 3) to a collector funnel 74 that leads to the downcomer 68 for the next lower stage.

Cooling water 76 flows across the base of each stage to cool the acid solution to control the reaction rate further. The waste stream 60 accumulates in the bottom of the generator 50 and may be scrubbed prior to pumping to waste storage.

Figure 4:
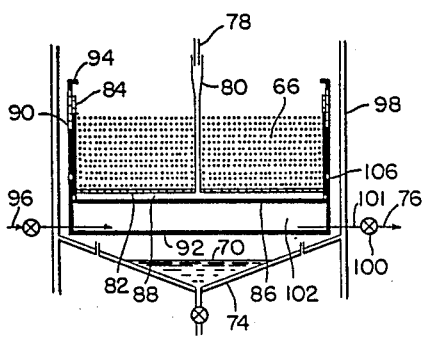
FIG. 4 is another detailed sectional view of a processing stage, similar to FIG. 3, showing a sliding tray within the retaining vessel.
Figure 5:
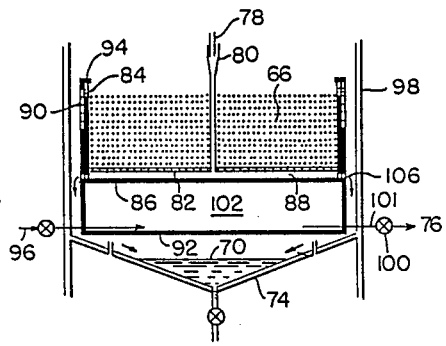
FIG. 5 is yet another detailed sectional view, similar to FIGS. 3 and 4, showing the tray at a different height.

Each processing stage of the hydrogen generator will now be described in greater detail with reference to FIGS. 3, 4, and 5.

Figure 3:
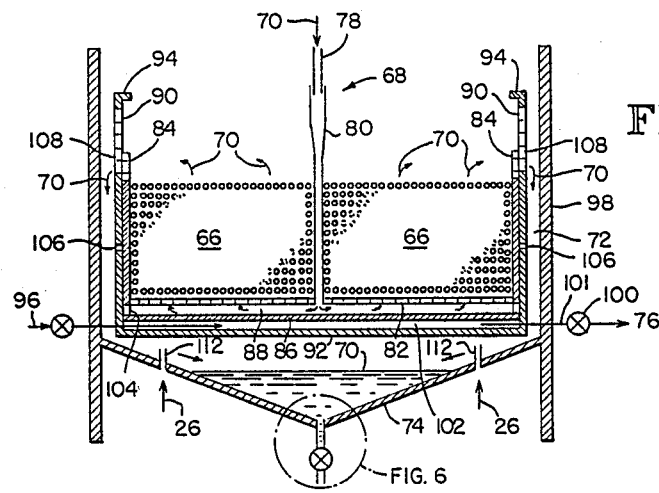
FIG. 3 is a detailed sectional view of one processing stage of the hydrogen generator of FIG. 2.

The downcomer 68 preferably has two sections which telescope together as illustrated by the straight section 78 and bell receiving section 80 in FIG. 3. The telescoping sections allow the length of downcomer 68 to be varied, as will be explained. The bell section 80 passes through the bed 66 and through a distributor plate 82 mounted within a sliding tray 84. The distributor plate 82 has a plurality of holes to allow the passage of the hydrochloric acid solution 70 upwardly through the distributor plate 82 and into the bed 66. The distributor plate 82 is positioned slightly above the bottom 86 of the sliding tray 84 to define a cavity 88 between the bottom 86 and the plate 82. The cavity allows uniform distribution of the acid solution across the bottom of the bed 66, which rests above the distributor plate. Thus, the hydrochloric acid solution flows countergravity through the bed 66 at a flowrate and velocity slow enough to avoid fluidizing the particles of the bed so that (1) optimum reaction conditions are achieved, (2) the particles are completely dissolved, and (3) no particles are entrained in the solution or are carried from the bed. The maximum amount of hydrogen is created from the minimum amount of metal.

The sliding tray 84 is received within a retaining vessel 90 to create a fluid seal between the side of the tray 84 and the wall of the vessel 90. As illustrated in FIGS. 3, 4, and 5, the tray can move upwardly and downwardly in the vessel 90 between the bottom of the vessel 92 and an end-of-motion limit 94 on the open end of the vessel.

Cooling water 76 entering the retaining vessel 90 through a feed line 96 in the outer jacket 98 can be used to lift the sliding tray 84 by restricting flow of the water from the vessel with a back pressure valve 100 on the outlet 101. The cooling water 76 within the retaining vessel 90 defines a chamber 102 between the bottom of the tray 86 and the bottom of the vessel 92 that has a variable volume. When this chamber 102 is increased in volume (raising the sliding tray 84), a port 104 on the tray can register with a drain port 106 intermediate within the wall of the retaining vessel 90 so that the acid solution 70 does not enter the bed 66, but flows directly from the cavity 88 through the aligned ports 104 and 106 into the annulus 72 between the retaining vessel 90 and the outer jacket 98. Any fluid remaining in the bed also will drain hydrostatically back through the distributor plate 82 into the cavity 88 and out the aligned ports 104 and 106 into the annulus 72 so that the reaction may be quickly stopped.

One or more ports 108 near the top of the wall of the retaining vessel 90 above the top of the tray allow acid solution 70 that emerges from the bed 66 to drain into the annulus 72 without passing over the lip of the retaining vessel.

Fluid in the annulus 72 falls to a funnel collector 74 and pools there due to a surge control means which will be described. The collector 74 preferably includes a plurality of necked openings 112 to allow passage of gas 26 upwardly through the several stages of the generator 50.

Figure 6:
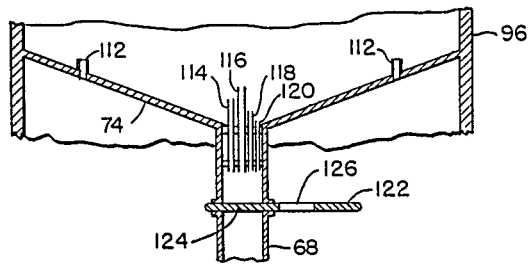
FIG. 6 is a schematic sectional detail of the collector and surge control, generally designated by the circle in FIG. 3.

The surge control means is more completely shown in FIG. 6. As illustrated there, the downcomer 68 is filled with a plurality of tubes or standpipes 114, 116, 118, and 120 having different diameters and being positioned at different heithts above the base of the funnel collector 74 so that solution must pool on the collector 74 before it enters the downcomer 68. If a surge of solution were to enter the funnel collector 74 (as by raising the sliding tray of an upper stage to align the ports 104 and 106) the standpipes 114, 116, 118 and 120 prevent a surge of solution from reaching the next stage. The surge control means, having no moving parts, protects against inadvertent introduction of acid to the beds during transit conditions (start-up, shutdown, loading, etc). The downcomers 68 may also include a "go - no go" valve 122 having a first portion 124 to seal the downcomer 68 and a second portion having an opening 126 to allow unrestricted flow of solution through the downcomer 68. This valve allows complete shut-off of lower stages in the generator.

Figure 7:
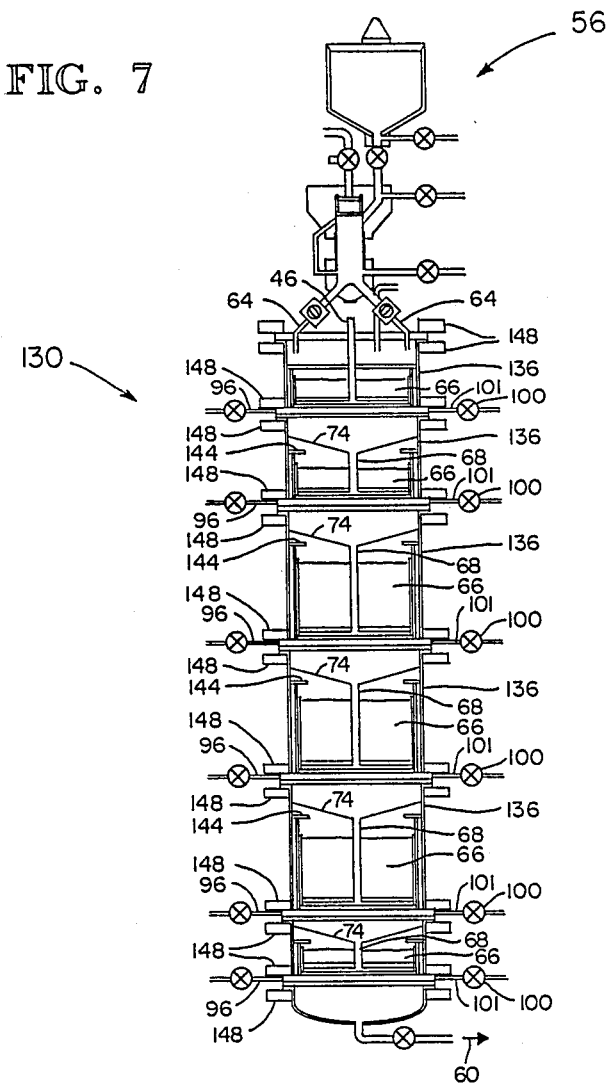
FIG. 7 is a detailed sectional schematic of another preferred embodiment of the hydrogen generator of the present invention.
Figure 8:
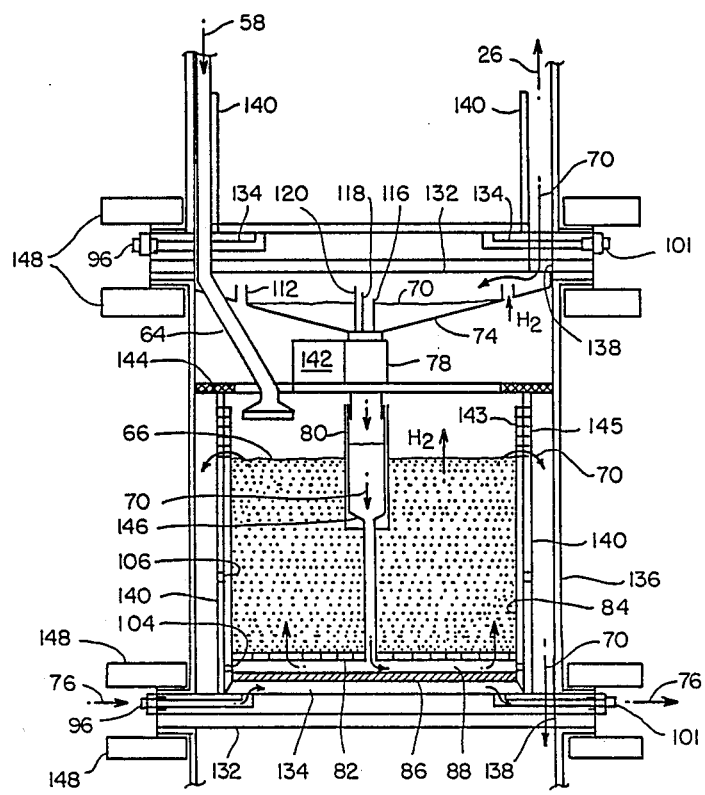
FIG. 8 is a detailed sectional view, similar to FIG. 3, showing a single processing stage of the generator of FIG. 7.

FIGS. 7 and 8 illustrate an alternative preferred embodiment of the present invention. Identical reference numbers are used to identify analagous parts between the embodiments. Again, the hydrogen generator 130 (FIG. 7) includes six beds 66 stacked within the reactor to generate hydrogen gas in successive stages. The upper beds 66 within the reactor usually are filled with pure iron particles while the lower beds contain zinc.

The differences in contruction between the two embodiments is best understood with reference to FIG. 8. Each processing stage includes a base 132 that includes an internal channel 134 for the circulation of cooling water 76 from an inlet 96 to the outlet 101. The base 132 also includes a through-hole 138 on one side of the base allow the passage of acid solution 70 downwardly through the base to the next processing stage and hydrogen gas 26 upwardly to the bonnet at the top of the generator 130.

The channel 134 has two segments within the base and a portion of variable volume defined by the base 132 and the bottom 86 of a sliding tray received between the walls 140 of a receiver or retainer vessel (generally being a 12 inch diameter teflonlined pipe) affixed to the base 132. A top plate or retaining ring 144 seats on the wall 140 and serves as a stop limit for movement of the sliding tray relative to the base 132 within the vessel.

A distributor plate 82 mounted within the sliding tray above the bottom 86 creates a cavity 88 into which the downcomer 68 (made of telescoping sections 78 and 80) delivers hydrochloric acid solution 70 for distribution upperwardly through the distributor plate 82 into the beds 66. The bell section 80 of the downcomer 68 may include an internal funnel 146 to further control flow of acid 70 to the cavity 88. The telescoping sections 78 and 80 allow the sliding tray to move relative to the base 132 and relative to the collector 74 of the next higher stage in the generator 130.

Drain ports 104 and 106 allow the rapid draining of the reactor bed by shunting fluid directly from the cavity 88 to the through-hole 138.

Pipe flanges 148 connect the base plates 132 to each section of the outer jacket 136 (formed from a 16 inch diameter Teflon lined pipe). As can be seen by comparison of FIGS. 3 and 8, the major difference between the two embodiments of the generator is that in one (fig. 3) the retaining vessel is mounted within the outer jacket 98, while in the other (FIG. 8) the base 132 and jacket 136 together form the structure of the generator.

This embodiment allows the number of trays within the generator to be varied, since each processing stage is separable from the stack. Consequently, however, the possibility of leaks is increased, since ther are a greater number of seals.

Drain ports 143 and 145 in both the tray 84 and vessel walls 140 are necessary in a second preferred embodiment to allow acid 70 to reach the passageway leading to the through-hole 138.

A water powered teflon shut-off valve 142 is positioned in the downcomer 68 to help control flow of acid between stages.

Figure 9:
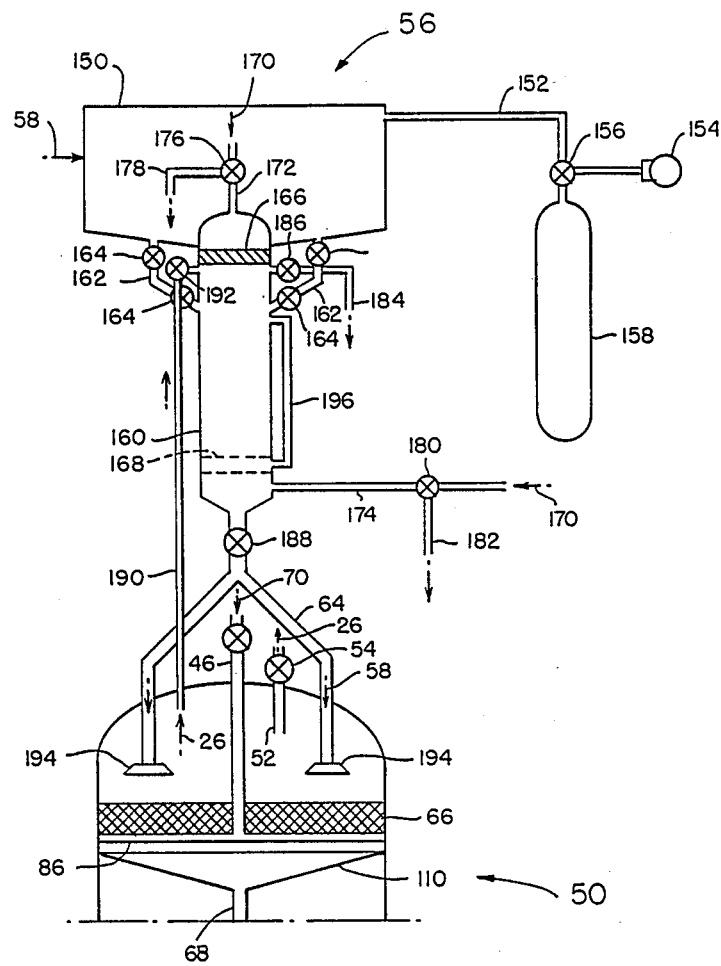
FIG. 9 is a detailed schematic of a preferred solid feed system for the generator of the present invention.

Referring to FIG. 9, the preferred solid fuel feed system will now be described.

The system 56 includes a receiving hopper 150 having an inlet (not shown) to allow introduction of metal particles 58 into the hopper 150 when the hopoper is vented to the atmosphere. The hopper 150 is connected through vacuum line 152 to a vacuum pump 154, which may be used to evacuate the hopper 150 to a pressure of about 1 psia or less, after the introduction of the metal particles to the hopper. The vacuum line is also connected through a two position valve 156 to a reservoir 158 of an inert gas, such as nitrogen. Following evacuation of the hopper, the vacuum pump 154 is stopped, and the valve 156 is opened to allow a positive pressure of gas to enter the receiving hopper 150 from the reservoir 158. This gas should be relatively insoluble in water and should be essentially non-reactive with with the metal particles. The gas is used in the hopper to prevent any damaging oxidation of the metal particles while they are stored in the hopper prior to injection into the hydrogen generator 50.

The receiving hopper 150 is connected to an injector 160 with one or more conduits 162 that allow metal particles within the receiving hopper 150 to be fed by gravity or otherwise to the injector 160. Each conduit 162 preferably includes two or more valves 164 which can be closed to isolate the injector 160 from the receiving hopper 150. These valves 164 are particularly important to alleviate hydrogen leakage between the injector and the receiving hopper.

The injector 160 is generally cylindrical, and includes a piston 166 that can reciprocate within the injector between the upper position shown in solid lines in FIG. 9 and a lower position schematically illustrated by the dotted lines 168 in FIG. 9. Stet movement of the piston 166 is achieved by injecting water 170 behind the piston 166 through a port 172 at the top of the injector 160 or an exhaust port 174 near the bottom of the injector. A control valve 176 in the water infeed line above the port 172 allows the flow of water to be controlled and allows fluid to be diverted from the injector through the port 172 to an exhaust line 178 to drain the injector when the piston moves from the lower position 168 to the upper position.

Similarly, a control valve 180 connected with the exhaust port 174 allows the water 170 to be shut off, and the injector 160 to communicate with a waste line 182 for draining.

An overflow drain 184, including a flow control valve 186 is connected to the injector 160 above the connecting conduits 162 to allow draining of water 170 from the injector when metal particles are transferred from the receiving hopper 150 to the injector 160. Entrained gas that is conveyed to the injector from the receiving hopper by the particles is of a lower density than the water within the injector, rises to the top of the injector, and is bled from the injector through the drain 184. The metal particles displace water within the injector and form a mixture of the metal particles and water only.

A valve 188 at the bottom of the injector 160 isolates the injector from the generator 50, and allows the injector to be filled with water 170 through line 174 prior to transfer of metal particles 58 from the receiving hopper 150 to the injector 160, as has been described. With metal particles in the injector, the control valves 164, 180, and 186 are closed, and hydrogen gas 26 passes from the generator 50 to the injector through line 190 by opening a control valve 192 in the line 190. The gas 26 enters the injector 160 near the upper end of the injector in the vicinity of the drain 184. With the valve 192 open, the control valve 180 is opened to allow the entering gas to drive the water between the particles in the injector out the waste line 182, leaving a combination of metal particles, hydrogen gas, and a small amount of entrained water within the injector. Then, the control valve 192 is closed and the valve 188 is opened. Water pressure is created behind piston 166 to drive the piston downwardly in the injector and to force metal particles, entrained gas, and water through fuel supply lines 64 into the generator 50. Distributor heads 194 rotate under the pressure of the metal particles in the supply lines 64 to distribute the particles uniformly over the bed 66.

A sight glass 196 on the side of the injector allows the operator to know the level of liquid in the injector 160 by viewing the meniscus between the liquid and gaseous phases.

While preferred embodiments of the invention have been shown and described, those skilled in the art will readily recognize alterations, modifications, or variations that might be made to the preferred embodiments without departing from the invention concept. The description and drawings are meant to illustrate the invention and not to limit it. The claims should be interpreted liberally in light of the description and drawings to protect the invention as described in the preferred embodiments and their full range of equivalents. The claims should only be limited as is necessary in view of the pertinent prior art.

We claim:

1. A method for efficiently generating hydrogen by the reaction of HCl with a metal, comprising the steps of:
   (a) introducing an HCl solution to the bottom of a bed of metal particles;
   (b) forcing the HCl solution upwardly through the bed at a flow rate and velocity sufficiently low to avoid fluidizing the particles;
   (c) collecting the HCl solution as the solution emerges from the top of the bed; and
   (d) collecting hydrogen created by the reaction of HCl with the metal.

2. The method of claim 1 further comprising the step of cooling the solution and bed to control the reaction rate.

3. A method for efficiently generating substantially pure hydrogen on demand by the reaction of HCl on a metal, comprising the steps of:
   (a) introducing an HCl solution to the bottom of a bed of metal particles through a distributor plate below the bed;
   (b) forcing the solution upwardly through the bed to generate hydrogen by the reaction of HCl with the metal, the flow rate and velocity being sufficiently low to avoid fluidizing the particles in the bed, the solution entirely dissolving each particle in the bottom of the bed to maximize the output of hydrogen per unit of metal; and
   (c) collecting the hydrogen above the bed.

4. The method of claim 1 further comprising the step of controlling the rate of reaction between the HCl and metal by cooling the solution before introducing the solution to the bed by flowing a refrigerant below the distributor plate.

5. A method for efficiently generating hydrogen by the reaction of HCl with a metal, comprising the steps of:
   (a) introducing an HCl solution to the bottom of a first bed of particles of a first metal wherein the first bed is held in a sliding tray of a retaining vessel;
   (b) forcing the HCl solution upwardly through the first bed a a flow rate and velocity sufficiently low to avoid fluidizing the particles;
   (c) collecting the HCl solution as the solution emerges form the top of the first bed;
   (d) collecting hydrogen created by the reaction of HCl with the metal; and
   (e) cooling the solution and first bed to control the reaction rate, wherein the cooling is achieved by a refrigerant within the retaining vessel.

6. The method of claim 5 further comprising the step of introducing the collected solution after emergence from the first bed to a second bed of metal particles.

7. The method of claim 6 wherein the step of introducing the collected solution includes feeding the collected solution to the bottom of the second bed, and wherein the method further comprises the steps of:
   (a) forcing the collected solution upwardly through the second bed at a flow rate and velocity sufficiently low to avoid fluidizing the particles; and
   (b) collecting the solution as the solution emerges from the top of the second bed.

8. The method of claim 7 wherein the first bed includes iron and the second bed includes zinc.

9. The method of claim 7 further comprising the step of cooling both the first and second bed to control the reaction rate of the HCl and the metal.

10. The method of claim 9 wherein the metal of the second bed is more reactive with HCl than the metal of the first bed.

11. The method of claim 9 wherein the step of cooling the rate of reaction between the HCl and metal provides the greatest cooling to the bottom of the bed where the HCl first encounters the metal.

12. The method of claim 5 wherein the step of cooling provides the greatest cooling at the bottom of the bed where the HCl first encounters the metal.

13. The method of claim 5 wherein the cooling is achieved with cooling water flowing through the retaining vessel below the first bed.

14. A method for efficiently generating substantially pure hydrogen on demand by the reaction of HCl on a metal, comprising the steps of:
   (a) introducing an HCl solution to the bottom of a bed of metal particles held in a sliding tray of a retaining vessel through a distributor plate below the bed;
   (b) forcing the solution upwardly through the bed to generate hydrogen by the reaction of HCl with the metal, the flow rate and velocity being sufficiently low to avoid fluidizing the particles in the bed, the solution entirely dissolving each particle in the bottom of the bed to maximize the output of hydrogen per unit of metal;
   (c) collecting the hydrogen above the bed; and
   (d) controlling the rate of reaction between the HCl metal by cooling the solution before introducing the solution to the bed by flowing a refrigerant below the distributor plate wherein the refrigerant is cooling water that flows through the retaining vessel below the sliding tray.

15. The method of claim 14 further comprising the steps of:
   (a) collecting the solution as it emerges from the top of the bed; and
   (b) introducing the collected solution to a second bed of metal particles to generate additional hydrogen.

16. The method of claim 14 wherein the metal particles in second bed have a higher reaction rate with HCl than the metal particles of the first bed.

17. The method of claim 14 further comprising adding particles to the top of the bed to ensure that the bed has adequate depth to achieve a predetermined output of hydrogen upon passage of the solution through the particles.

18. A method for efficiently generating hydrogen by the reaction of HCl with a metal, comprising the steps of:
   (a) feeding a solution of HCl upwardly through a first bed of metal particles of iron at a flow rate and velocity sufficiently low to avoid fluidizing the particles in the first bed wherein the first bed is contained within a sliding tray of a retaining vessel;

(b) cooling the first bed from the bottom where the HCl first encounters the iron to control the reaction rate between the HCl and the metal wherein cooling is achieved by flowing cooling water through the retaining vessel below the sliding tray;

(c) collecting the solution as the solution emerges from the top of the first bed;

(d) feeding the collected solution upwardly through a second bed of metal particles of zinc at a flow rate and velocity sufficiently low to avoid fluidizing the particles in the second bed;

(e) cooling the second bed from the bottom where the HCl first encounters the zinc to control the reaction rate between the HCl and the metal of the second bed; and (f) collecting the hydrogen generated by the reaction of the HCl with the metals of the first and second beds.

19. The method of claim 18 wherein the hydrogen is essentially pure and is suitable for use in a hydrogen-chlorine fuel cell.

20. A method for efficiently generating hydrogen by the reaction of HCl with a metal, comprising the steps of:

(a) feeding a solution of HCl upwardly through a first bed of metal particles of iron at a flow rate and velocity sufficiently low to avoid fluidizing the particles in the first bed;

(b) cooling the first bed from the bottom where the HCl first encounters the iron to control the reaction rate between the HCl and the metals;

(c) collecting the solution as the solution emerges from the top of the first bed;

(d) feeding the collected solution upwardly through a second bed of metal particles of zinc at a flow rate and velocity sufficiently low to avoid fluidizing the particles in the second bed;

(e) cooling the second bed from the bottom where the HCl first encounters the zinc to control the reaction rate between the HCl and the metal of the second bed; and (f) collecting the hydrogen generated by the reaction of the HCl with the metals of the first and second beds.

* * * * *